(12) United States Patent
Ohta et al.

(10) Patent No.: US 8,767,748 B2
(45) Date of Patent: Jul. 1, 2014

(54) SIGNAL DISTRIBUTION CIRCUIT AND STUFFING CONTROL UNIT

(75) Inventors: Masafumi Ohta, Kawasaki (JP); Hiromichi Makishima, Kawasaki (JP); Hiroyuki Honma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 268 days.

(21) Appl. No.: 13/220,297

(22) Filed: Aug. 29, 2011

(65) Prior Publication Data

US 2012/0134367 A1 May 31, 2012

(30) Foreign Application Priority Data

Nov. 29, 2010 (JP) ................................. 2010-265127

(51) Int. Cl.
*H04W 72/04* (2009.01)
*H04W 84/08* (2009.01)
*H04B 7/26* (2006.01)

(52) U.S. Cl.
CPC .......... *H04W 72/0446* (2013.01); *H04W 84/08* (2013.01); *H04B 7/2628* (2013.01)
USPC ...... 370/395.51; 370/335; 370/336; 370/337; 398/43; 398/58

(58) Field of Classification Search
CPC ... H04W 72/0446; H04W 4/10; H04W 84/08; H04L 12/4604; H04L 2012/5654; H04B 7/2628; H04B 7/2643; H04B 1/50
USPC .......... 370/395.51, 395.53, 395.61, 335, 334, 370/542; 375/462, 463; 398/41, 42, 43, 47, 398/49, 50, 58
See application file for complete search history.

(56) References Cited

U.S. PATENT DOCUMENTS

2005/0180331 A1 * 8/2005 Fujita ........................ 370/241.1

FOREIGN PATENT DOCUMENTS

JP 2004-62588 2/2004

* cited by examiner

*Primary Examiner* — Ian N Moore
*Assistant Examiner* — Hien Nguyen
(74) *Attorney, Agent, or Firm* — Fujitsu Patent Center (57) ABSTRACT

A signal distribution circuit includes: first to n-th input lines on which first to n-th signals are respectively input; first to (n−1)th selectors each of which selects one of two inputs under the control of a select signal; and a first output line on which the first signal is output and second to n-th output lines on which output signals of the first to (n−1)th selectors are respectively output, wherein: the first and second inputs of the first selector are supplied with the first signal and the second signal, respectively, the first and second inputs of the i-th selector (i is an integer between 2 and (n−1)) are supplied with the output signal of the (i−1)th selector and the (i+1)th signal, respectively, and any of the selectors, when selected by the select signal, selects the second input and, when not selected by the select signal, selects the first input.

11 Claims, 11 Drawing Sheets

SIGNAL DISTRIBUTION CIRCUIT AND STUFFING CONTROL UNIT

CROSS-REFERENCE TO RELATED APPLICATIONS

This application is based upon and claims the benefit of priority of the prior Japanese Patent Application No. 2010-265127, filed on Nov. 29, 2010, the entire contents of which are incorporated herein by reference.

FIELD

The embodiments discussed herein are related to a signal distribution circuit which distributes input signals received on a plurality of input lines to a plurality of output lines.

BACKGROUND

A transmission apparatus for transmitting frame signals is attached to a communication network. The transmission apparatus multiplexes or demultiplexes frame signals into frame signals of another format, or adds or drops frame signals to or from frame signals of another format. The frame signals will hereinafter be referred to simply as "frames."

Figure 1:
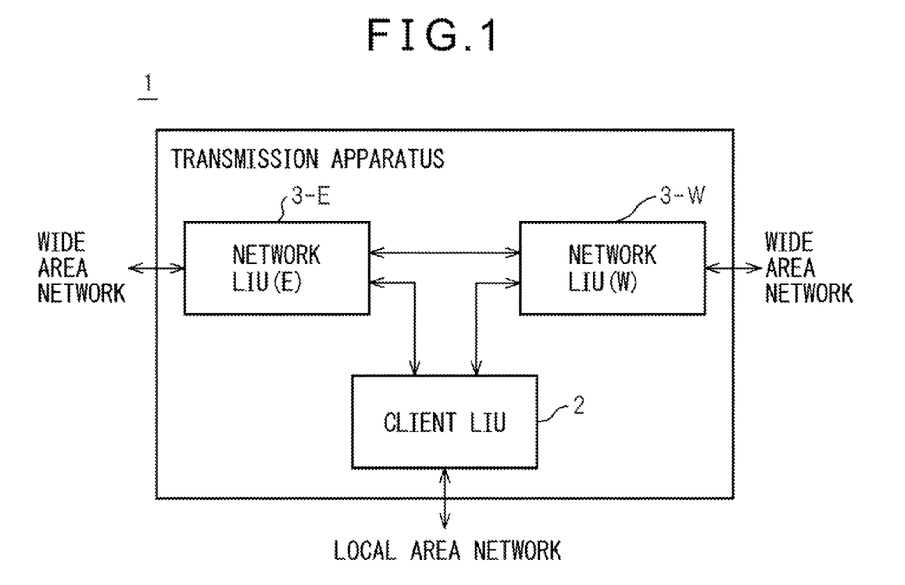
FIG. 1 is a diagram illustrating a configuration example of a transmission apparatus.

FIG. 1 is a diagram illustrating a configuration example of a transmission apparatus. The transmission apparatus 1 includes a client line interface unit 2 and network line interface units 3-E and 3-W. In the description and drawings given hereinafter, the line interface units will each be designated as LIU.

The client LIU 2 receives a frame from a client apparatus connected to a local area network, and transfers the frame to the network LIU 3-E or 3-W according to the destination of the frame.

The network LIU 3-E is responsible for transmitting a frame transferred from the network LIU 3-W onto a wide area network, and for adding a frame received from the client LIU 2 onto a frame suitable for transmission to the wide area network. The network LIU 3-E is also responsible for transferring to the client LIU 2 a frame created by dropping a signal stored in a frame received from the wide area network.

The network LIU 3-W is responsible for transmitting a frame transferred from the network LIU 3-E onto a wide area network, and for adding a frame received from the client LIU 2 onto a frame suitable for transmission to the wide area network. The network LIU 3-W is also responsible for transferring to the client LIU 2 a frame created by dropping a signal stored in a frame received from the wide area network.

For example, the client LIU 2 may map an asynchronous frame received from the local area network into an ODUk frame and transfer the ODUk frame to the network LIU 3-E or 3-W. The network LIU 3-E or 3-W may map the ODUk frame received from the client LIU 2 into a higher-speed OTU frame, thereby adding the ODUk frame onto the OTU frame for transmission to the wide area network. Further, the network LIU 3-E or 3-W may drop an ODUk frame from an OTU frame received from the wide area network and transfer the ODUk frame to the client LIU 2.

Figure 2:
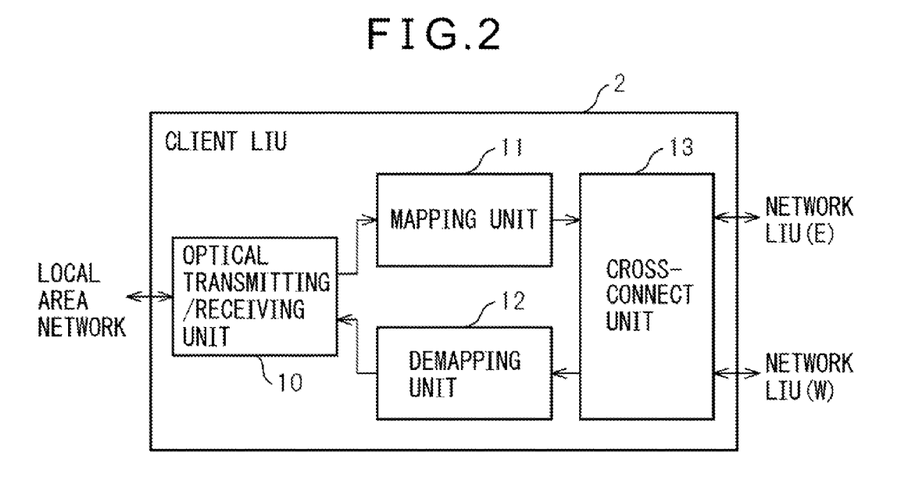
FIG. 2 is a diagram illustrating a configuration example of a client LIU depicted in FIG. 1.

FIG. 2 is a diagram illustrating a configuration example of the client LIU 2 depicted in FIG. 1. The client LIU 2 includes an optical transmitting/receiving unit 10, a mapping unit 11, a demapping unit 12, and a cross-connect unit 13.

The optical transmitting/receiving unit 10 receives a frame transmitted from the client apparatus via a local area network and converts it into an electrical signal. The mapping unit 11 maps a client signal stored in the received frame into a synchronous frame. The cross-connect unit 13 forms a cross-connect for transferring the synchronous frame to one or the other of the network LIUs 3-E and 3-W according to the destination of the client signal.

The cross-connect unit 13 also forms a cross-connect for directing to the demapping unit 12 a synchronous frame to be transferred from the network LIU 3-E or 3-W to the client LIU 2. The demapping unit 12 demaps the synchronous frame to extract a signal to be transmitted to the client and passes the extracted signal to the optical transmitting/receiving unit 10. The optical transmitting/receiving unit 10 converts the extracted signal into an optical signal and transmits it to the local area network.

Figure 3:
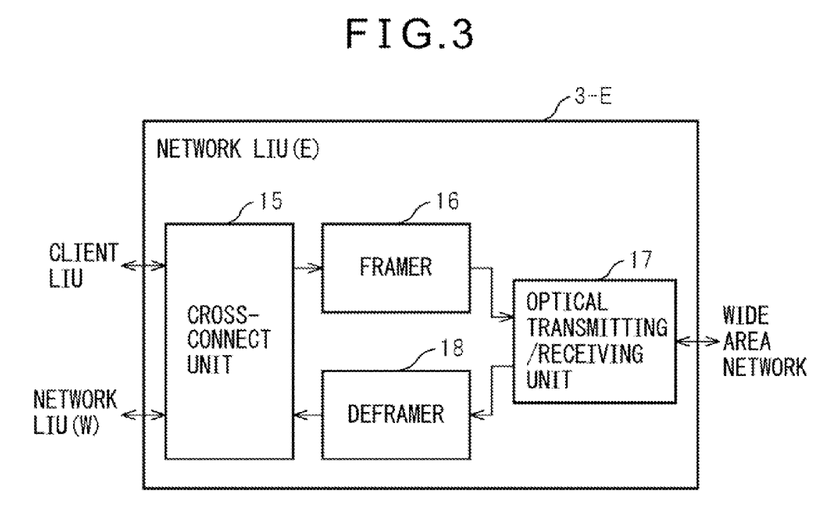
FIG. 3 is a diagram illustrating a configuration example of a network LIU depicted in FIG. 1.

FIG. 3 is a diagram illustrating a configuration example of the network LIU 3-E depicted in FIG. 1. The network LIU 3-W has substantially the same configuration. The network LIU 3-E includes a cross-connect unit 15, a framer 16, an optical transmitting/receiving unit 17, and a deframer 18.

The cross-connect unit 15 forms a cross-connect for transferring the synchronous frame received from the client LIU 2 to the framer 16. The cross-connect unit 15 also forms a cross-connect for receiving a synchronous frame from the network LIU 3-W or transferring a synchronous frame to the network LIU 3-W.

The framer 16 maps the synchronous frame received from the client LIU 2 into a higher-speed synchronous frame for transmission to the wide area network. The optical transmitting/receiving unit 17 converts the synchronous frame generated by the framer 16 into an optical signal and transmits it to the wide area network.

The deframer 18 demaps a frame that the optical transmitting/receiving unit 17 received from the wide area network into a lower-speed synchronous frame. The cross-connect unit 15 forms a cross-connect for transferring the demapped synchronous frame to the client LIU 2.

The mapping unit 11, demapping unit 12, framer 16, and deframer 18 described above are each equipped with a stuffing control unit for controlling of stuffing inserted in an output frame. The stuffing control unit determines the amount of stuffing inserted in the output frame and the position of insertion in accordance with the speed difference between the input data and the output data.

Figure 4:
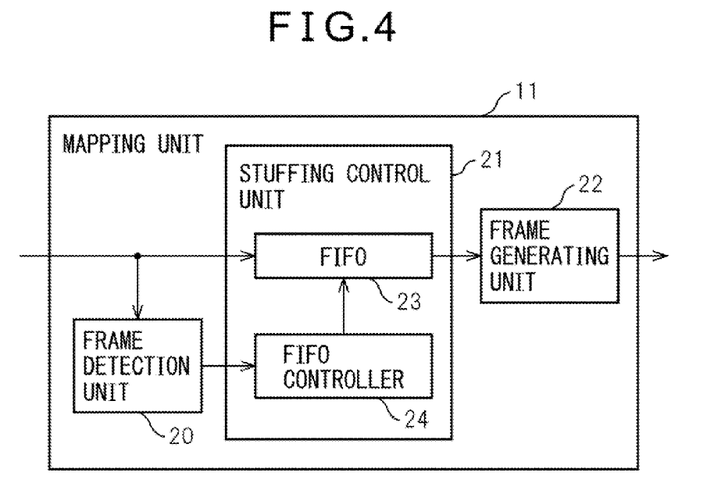
FIG. 4 is a diagram illustrating a configuration example of a mapping unit depicted in FIG. 2.

FIG. 4 is a diagram illustrating a configuration example of the mapping unit 11 equipped with such a stuffing control unit. The mapping unit 11 includes a frame detection unit 20, a stuffing control unit 21, and a frame generating unit 22. The demapping unit 12, the framer 16, and the deframer 18 may each be equipped with a stuffing control unit similar to the stuffing control unit 21 described hereinafter.

The frame detection unit 20 detects or synchronously detects an input frame, and supplies the stuffing control unit 21 with a timing signal that indicates the timing that the information to be stored in the output frame is input from among the information stored in the input frame.

The stuffing control unit 21 includes a FIFO (first-in, first-out) memory 23, such as an elastic store memory, and a FIFO controller 24. The FIFO controller 24 generates, based on the timing signal received from the frame detection unit 20, a write enable signal for writing the input frame to the FIFO memory 23, and generates a write address based on the write enable signal.

Further, the FIFO controller 24 generates a read address for reading transmit data from the FIFO memory 23. When generating the read address, the FIFO controller 24 controls the amount of stuffing to be inserted and the position of insertion by adjusting the generation of a read enable signal, based on the speed difference between the input data and the output data and on the amount of generation of the write enable signal.

The frame generating unit 22 stores the data read out by the stuffing control unit 21 into a synchronous frame.

Figure 5:
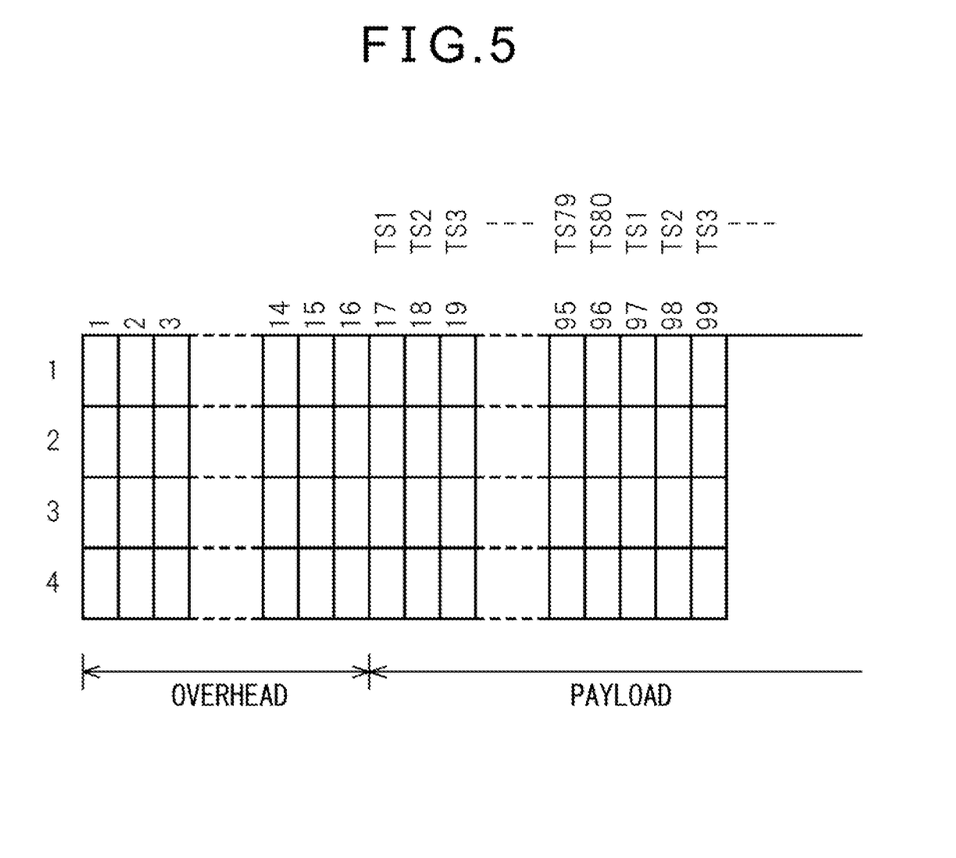
FIG. 5 is an explanatory diagram of tributary slots.

The payload of the synchronous frame is divided into data storage areas referred to as "slots" each for carrying a prescribed amount of data. Each slot is used as the smallest unit of storage area to which one client signal is mapped. An example of such a slot is the "tributary slot" used in the OPU (Optical channel payload unit) k format standardized by the ITU-T (International Telecommunication Union Telecommunication Standardization Sector). FIG. 5 is an explanatory diagram of the tributary slot.

The OPUk frame includes an overhead area and a payload area. The overhead area has a frame size of 16 bytes×4 rows in the first to 16th columns. The payload area has a frame size of 3808 bytes×4 rows in the 17th to 3824th columns.

FIG. 5 illustrates an example of a frame format in which the payload area is divided into 80 tributary slots TS1 to TS80. The 17th column, the 97th column, the 177th column, etc., are used for the tributary slot TS1. On the other hand, the 18th column, the 98th column, the 178th column, etc., are used for the tributary slot TS2. Likewise, the 19th column, the 99th column, the 179th column, etc., are used for the tributary slot TS3, and the 96th column, the 176th column, the 256th column, etc., are used for the tributary slot TS80.

Figure 6:
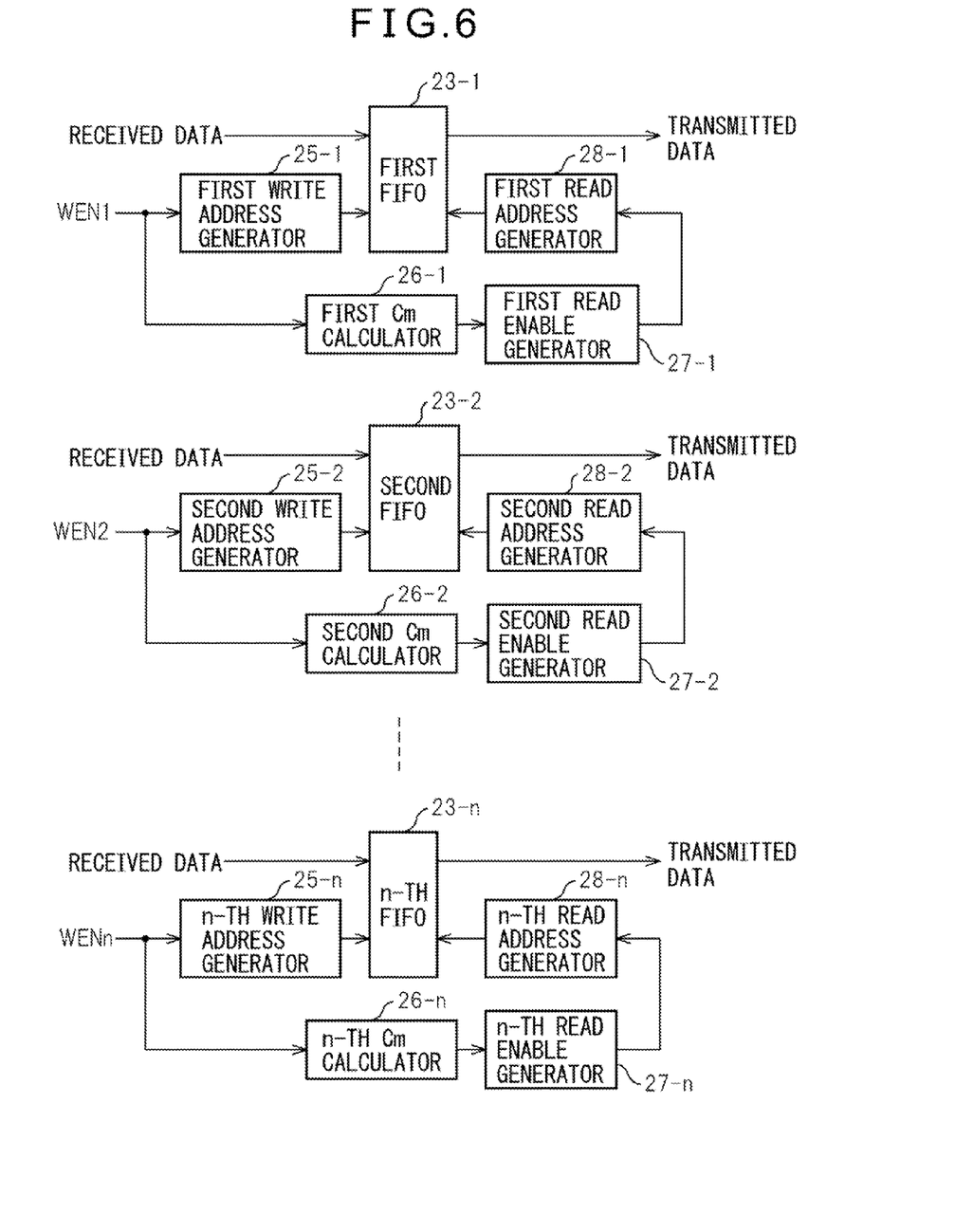
FIG. 6 is a diagram illustrating a prior art configuration example of a stuffing control unit depicted in FIG. 4.

FIG. 6 is a diagram illustrating a prior art configuration example of the stuffing control unit 21 depicted in FIG. 4. Read/write to the FIFO memory and the insertion of stuffing are performed on a slot-by-slot basis so that a different client signal can be stored in each slot. In the configuration example illustrated in FIG. 6, it is assumed that the payload area is divided into n slots.

The stuffing control unit 21 includes first to n-th FIFOs 23-1 to 23-n, first to n-th write address generators 25-1 to 25-n, and first to n-th Cm calculators 26-1 to 26-n. The stuffing control unit 21 further includes first to n-th read enable generators 27-1 to 27-n and first to n-th read address generators 28-1 to 28-n.

The first to n-th FIFOs 23-1 to 23-n respectively store the client signals to be stored in the first to n-th slots of the output frame. The client signals stored in the first to n-th slots will be designated as the first to n-th client signals, respectively.

The first to n-th write address generators 25-1 to 25-n respectively take as inputs the write enable signals WEN1 to WENn, generated based on the timing signal received from the frame detection unit 20, for writing the first to n-th client signals to the first to n-th FIFOs 23-1 to 23-n, respectively.

Based on the write enable signals WEN1 to WENn, the first to n-th write address generators 25-1 to 25-n respectively generate the write addresses for writing the first to n-th client signals. The first to n-th write address generators 25-1 to 25-n respectively specify the write addresses in the first to n-th FIFOs 23-1 to 23-n by the thus generated addresses.

The first to n-th Cm calculators 26-1 to 26-n respectively receive the write enable signals WEN1 to WENn as inputs. The first to n-th Cm calculators 26-1 to 26-n count the number of occurrences of the respective write enable signals WEN1 to WENn. In the following description, a count of the number of occurrences of the write enable signal may be referred to as the "Cm value." The first to n-th Cm calculators 26-1 to 26-n supply the calculated Cm values to the first to n-th read enable generators 27-1 to 27-n.

Based on the respectively received Cm values and the speed differences between the input data and the output data, the first to n-th read enable generators 27-1 to 27-n each determine the amount of stuffing inserted and the position of insertion.

The first to n-th read enable generators 27-1 to 27-n may each determine the amount of stuffing inserted and the position of the insertion by using, for example, GMP operations in accordance with the generic mapping procedure (GMP). Based on the thus determined stuffing insertion positions, the first to n-th read enable generators 27-1 to 27-n respectively generate the read enable signals for reading the first to n-th client signals from the first to n-th FIFOs 23-1 to 23-n. The first to n-th read enable generators 27-1 to 27-n supply the read enable signals to the first to n-th read address generators 28-1 to 28-n, respectively.

Based on the received read enable signals, the first to n-th read address generators 28-1 to 28-n respectively generate the read addresses for reading the first to n-th client signals.

In the above stuffing control unit 21, the control signals for controlling read/write operations on the first to n-th FIFOs 23-1 to 23-n may be shared among different slots. Such control signals include, for example, the write enable signal, write address, Cm value, read enable signal, and read address.

For example, in the above GMP, one client signal can be mapped into a plurality of tributary slots. In the following description, a group of slots for one repeat cycle of the slot numbers within one frame will be referred to as the "repeating unit group." For example, in the frame format example of FIG. 5, the tributary slots TS1 to TS80 in the 17th to 96th columns form one repeating unit group, and the tributary slots TS1 to TS80 in the 97th to 176th columns form another repeating unit group.

Further, a group made up of a plurality of slots transporting the same client signal will be referred to as the "slot group." When mapping one client signal into a plurality of tributary slots, the stuffing insertion position is controlled so that each slot belonging to the same slot group within the same repeating unit group either contains all data or contains all stuffing. That is, the stuffing insertion position is synchronized among the tributary slots belonging to the same slot group.

In order to synchronize the stuffing insertion position among the plurality of slots belonging to the same slot group, the stuffing control unit 21 uses a signal distribution circuit which is configured to distribute the control signal generated for one of the slots in one slot group to the other slots belonging to the same slot group. More specifically, the signal distribution circuit has n pairs of input/output lines (n is a natural number), and is configured so that when the n pairs of input/output lines are divided into groups, an input signal to one of the input lines in each group is distributed to all the output lines belonging to the same group. As an example, a description will be given below for the case where the Cm value is distributed.

Figure 7:
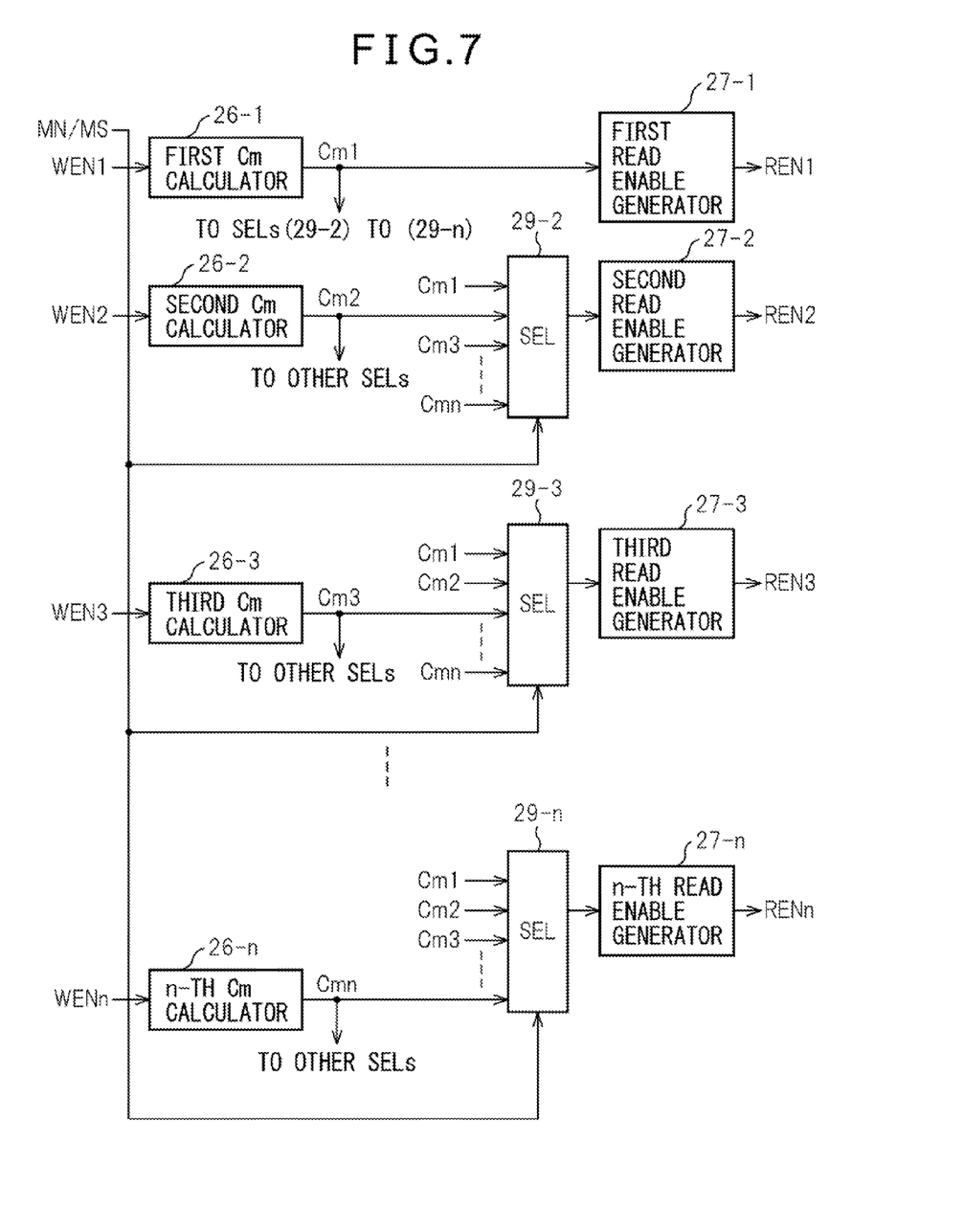
FIG. 7 is a diagram illustrating a prior art signal distribution circuit for distributing a Cm value.

FIG. 7 is a diagram illustrating a prior art signal distribution circuit for distributing the Cm value. The signal distribution circuit includes selectors 29-2 to 29-n. The selectors 29-2 to 29-n each take, as first to n-th inputs, the Cm values Cm1 to Cmn calculated by the first to n-th Cm calculators 26-1 to 26-n, respectively. In the description and drawings given hereinafter, the "selector" may be designated as SEL.

Each of the selectors 29-2 to 29-n selects one of the Cm values Cm1 to Cmn under the control of member specifying information MN and master specifying information MS, and supplies the selected Cm value to a corresponding one of the second to n-th read enable generators 27-2 to 27-n. The first read enable generator 27-1 is supplied with the Cm value Cm1 calculated by the first Cm calculator 26-1.

Figure 8:
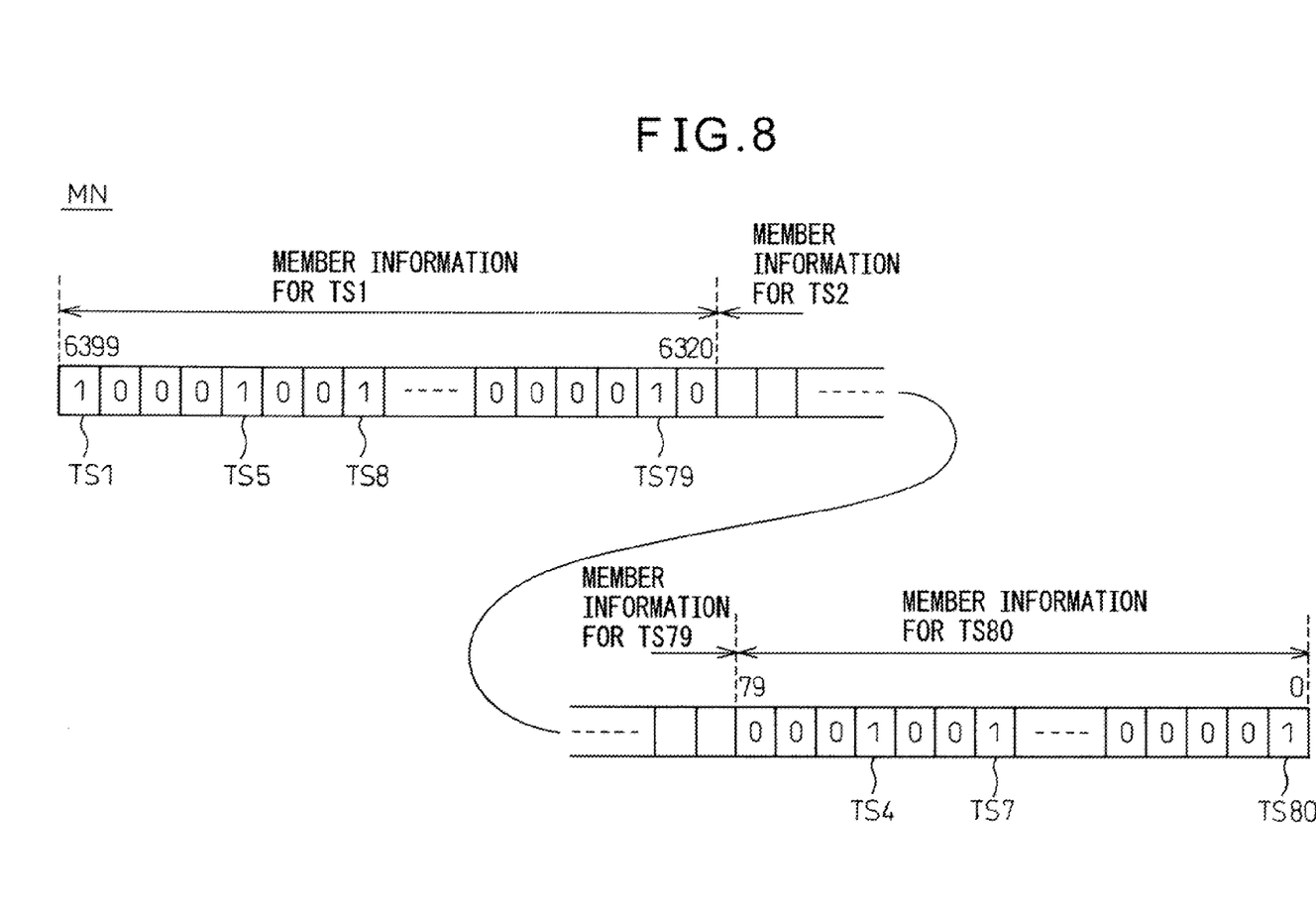
FIG. 8 is a diagram illustrating an example of the format of member specifying information MN.

The member specifying information MN specifies the slots belonging to each slot group. FIG. 8 is a diagram illustrating an example of the format of the member specifying information MN. The illustrated example depicts the format of the member specifying information MN for the case where the upper limit number of tributary slots is 80. The high-order ((i−1)×80+1)th to (i×80)th bits of the member specifying information MN carry information for the i-th tributary slot.

If the value of the high-order ((i−1)×80+j)th bit is "1", it indicates that the j-th tributary slot belongs to the same slot group as the i-th tributary slot. If the value of the high-order ((i−1)×80+j)th bit is "1", it indicates that the j-th tributary slot belongs to a slot group other than the i-th tributary slot.

In the illustrated example, the tributary slots TS5, TS8, and TS79 belong to the same slot group as the tributary slot TS1. The tributary slots TS7 and TS80 belong to the same slot group as the tributary slot TS4.

Figure 9:
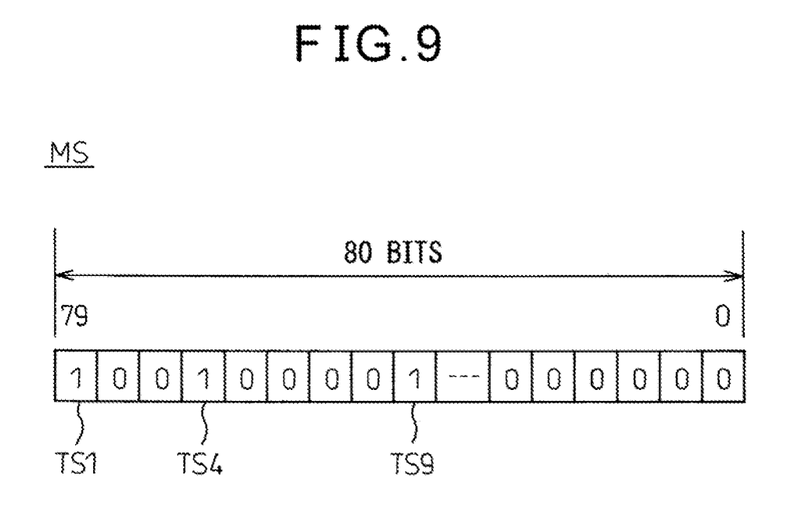
FIG. 9 is a diagram illustrating an example of the format of master specifying information MS.

FIG. 9 is a diagram illustrating an example of the format of the master specifying information MS. The master specifying information MS specifies the master slot in each slot group. The signal distribution circuit distributes the control signal input for the master slot to the other slots in the same slot group. The slots other than the master slot may be designated as "slave slots."

The illustrated example depicts the format of the master specifying information MS for the case where the upper limit number of tributary slots is 80. If the value of the high-order i-th bit is "1", the i-th slot is the master slot. If the value of the high-order i-th bit is "0", the i-th slot is a slave slot. In the illustrated example, the tributary slots TS1, TS4, and TS9 are specified as the master slots.

Reference is made to FIG. 7. When the master specifying information MS specifies the i-th slot as the master slot, the SEL 29-i (i is an integer between 2 and n) selects Cmi for output to the i-th read enable generator 27-i.

If the i-th slot is a slave slot, the SEL 29-i selects for output to the i-th read enable generator 27-i the Cm value Cmj calculated for the j-th slot which is the master slot belonging to the same slot group as the i-th slot.

In the prior art, a selector circuit has been proposed that can drastically reduce the amount of circuitry when reading data of a plurality of words from a plurality of data. This selector circuit includes: a pointer counter which outputs pointer data pointing to data to be read out; a data selection circuit which, based on the pointer data from the pointer counter, generates pointer values indicating the starting positions of the data to be read out, the number of pointer values being equal to the number of words; a front-end selector array which is constructed from as many selectors as the number of words and which outputs data that are divided between the selectors and are selected based on the pointer values from the data selection circuit; an order selection circuit for selecting the order in which the selected data are to be read out based on the pointer data from the pointer counter; and a back-end selector 2 which receives the selected data from the front-end selector array and outputs the selected data by reordering the data in accordance with an output from the order selection circuit.

Related art is disclosed in Japanese Laid-open Patent Publication No. 2004-62588.

SUMMARY

A signal distribution circuit according to one embodiment includes: first to n-th input lines (n is a natural number) on which first to n-th signals are respectively input; first to (n−1)th selectors each of which selects one of two inputs under the control of a select signal; and a first output line on which the first signal is output and second to n-th output lines on which output signals of the first to (n−1)th selectors are respectively output. First and second inputs forming the two inputs of the first selector are supplied with the first signal and the second signal, respectively, and first and second inputs forming the two inputs of the i-th selector (i is an integer between 2 and (n−1)) are supplied with the output signal of the (i−1)th selector and the (i+1)th signal, respectively. Any of the selectors, when selected by the select signal, selects the second input for connection to output and, when not selected, selects the first input for connection to output.

A stuffing control unit according to another embodiment includes: first to n-th elastic memory stores (n is a natural number) which hold data to be stored in first to n-th slots, respectively; and a signal distribution unit. The signal distribution unit takes first to n-th signals as inputs, the first to n-th signals being control signals for writing or reading the data to be stored in the first to n-th slots to or from the first to n-th elastic memory stores, and which distributes the first to n-th signals for the first to n-th elastic memory stores. The signal distribution unit includes: first to n-th input lines on which the first to n-th signals are respectively input; first to (n−1)th selectors each of which selects one of two inputs under the control of a select signal; and a first output line on which the first signal is output for the first elastic memory store and second to n-th output lines on which output signals of the first to (n−1)th selectors are respectively output for the second to n-th elastic memory stores. First and second inputs forming the two inputs of the first selector are supplied with the first signal and the second signal, respectively, first and second inputs forming the two inputs of the i-th selector (i is an integer between 2 and (n−1)) are supplied with the output signal of the (i−1)th selector and the (i+1)th signal, respectively, and any of the selectors, when selected by the select signal, selects the second input for connection to output and, when not selected, selects the first input for connection to output.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT(S)

Figure 10:
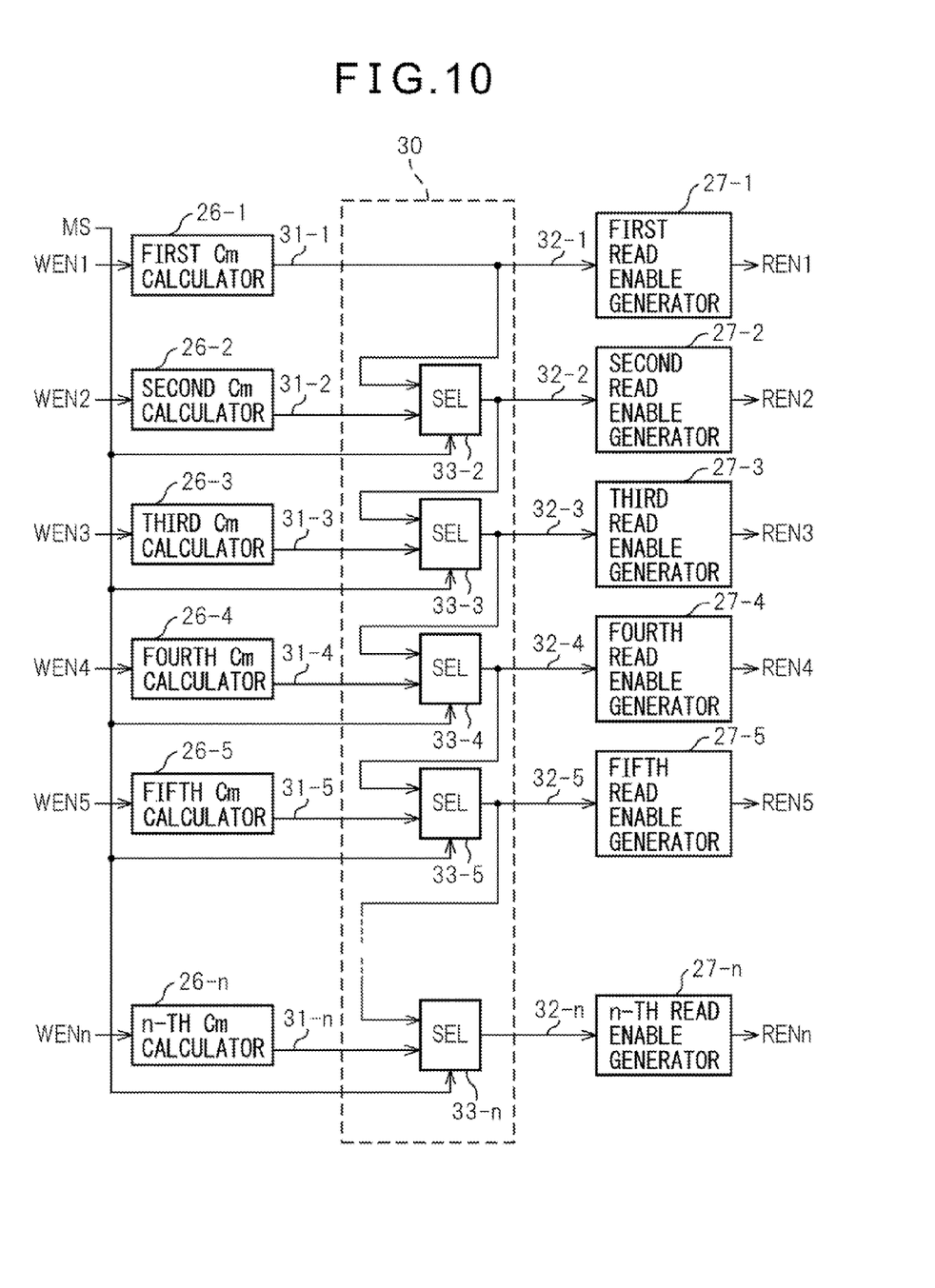
FIG. 10 is a diagram illustrating a first configuration example of a signal distribution circuit.

Preferred embodiments of the present invention will be explained with reference to the accompanying drawings. FIG. 10 is a diagram illustrating a first configuration example of a signal distribution circuit. The signal distribution circuit 30 is incorporated, for example, in the stuffing control unit provided in each of the mapping unit 11 and demapping unit 12 depicted in FIG. 2 or in each of the framer 16 and deframer 18 depicted in FIG. 3.

The signal distribution circuit 30 includes first to n-th input lines 31-1 to 31-n, first to n-th output lines 32-1 to 32-n, and second to n-th SELs 33-2 to 33-n. The first to n-th input lines 31-1 to 31-n are paired with the first to n-th output lines 32-1 to 32-n, respectively, thus forming n pairs of input/output lines.

In the present embodiment, the second to n-th SELs 33-2 to 33-n are given as an example of the first to (n−1)th selectors described in the appended claims.

In the configuration example of FIG. 10, the signal distribution circuit 30 takes as inputs the Cm values Cm1 to Cmn calculated by the first to n-th Cm calculators 26-1 to 26-n, and distributes one Cm to a plurality of slots.

The signal distribution circuit 30 receives Cm1 to Cmn on the first to n-th input lines 31-1 to 31-n, respectively. Signals output on the first to n-th output lines 32-1 to 32-n are supplied as inputs to the first to n-th read enable generators 27-1 to 27-n, respectively.

The signal distribution circuit 30 may distribute the write enable signal, write address, read enable signal, or read address generated for a certain slot to a plurality of slots in a manner similar to the distribution of the Cm value hereinafter described. Further, the signal distribution circuit 30 may be implemented as a circuit that distributes data for a certain slot to a plurality of slots.

Cm1 as the first signal is output on the first output line 32-1. Signals from the second to n-th SELs 33-2 to 33-n are output on the second to n-th output lines 32-2 to 32-n, respectively. Each of the SELs 33-2 to 33-n is a 2:1 selector that has two inputs, the first input and the second input, and that selects one of the two inputs under the control of a select signal.

Cm1 and Cm2 as the second signal are supplied to the first and second inputs, respectively, of the second SEL 33-2. The output signal of the (i−1)th SEL 33-(i−1) and Cmi as the i-th signal are supplied to the first and second inputs, respectively, of the i-th SEL 33-i (i is an integer between 3 and n). That is, the signal distribution circuit 30 includes a cascade connection in which the output of the (i−1)th SEL 33-(i−1) is connected to the first input of the i-th SEL 33-i (i is an integer between 3 and n).

The select signal is supplied to each of the SELs 33-2 to 33-n. The select signal is a signal for selecting one of the SELs 33-2 to 33-n. The select signal may be used to select more than one SEL. Any of the SELs 33-2 to 33-n, when selected by the select signal, selects the second input for connection to the associated one of the second to n-th output lines 32-2 to 32-n. Any of the SELs 33-2 to 33-n, when not selected by the select signal, selects the first input for connection to the associated one of the second to n-th output lines 32-2 to 32-n.

The pair of the first input and output lines 31-1 and 32-1, the pair of the second input and output lines 31-2 and 32-2, . . . , and the pair of the n-th input and output lines 31-n and 32-n will hereinafter be referred to as the "first signal line pair," the "second signal line pair," . . . , and the "n-th signal line pair," respectively.

For example, consider the case where the n signal line pairs are divided into three groups. The first group includes the first to (i−1)th signal line pairs. The second group includes the i-th to (j−1)th signal line pairs. The third group includes the j-th to n-th signal line pairs, i is an integer larger than 1, and j is an integer larger than i. In this case, the select signal selects the i-th and j-th SELs 33-i and 33-j.

The second to (i−1)th SELs 33-2 to 33-(i−1) each select the first input. As a result, the output lines 32-1 to 32-(i−1) in the first group output the same value Cm1.

On the other hand, the i-th SEL 33-i selects the second input. As a result, the i-th output line 32-i outputs Cmi. The (i+1)th to (j−1)th SELs 33-(i+1) to 33-(j−1) each select the first input. As a result, the output lines 32-i to 32-(j−1) in the second group output the same value Cmi.

The j-th SEL 33-j selects the second input. On the other hand, the (j+1)th to n-th SELs 33-(j+1) to 33-n each select the first input. As a result, the output lines 32-j to 32-n in the third group output the same value Cmj.

Accordingly, when the following condition (1) is satisfied, the signal distribution circuit 30 distributes the signal input on the i-th input line in each group of signal line pairs to all the output lines in the same group, where i is the smallest ordinal number in each group.

(1) The ordinal numbers i representing the i-th input line and i-th output line in each group are contiguous. That is, when the i-th SEL is not selected, the i-th signal line pair belongs to the same group as the (i−1)th signal line pair.

In the configuration example of FIG. 10, if the slot groups are organized so that the slot numbers of the tributary slots belonging to the same slot group are contiguous, the signal distribution circuit 30 can be used as a signal distribution circuit for distributing the Cm value within each slot group. In this case, the master specifying information MS may be used as the select signal for the SELs 33-2 to 33-n. The master specifying information MS specifies as the master slot the tributary slot having the smallest slot number in each slot group.

The signal distribution circuit 30 according to the present embodiment, which is constructed by cascading the second to n-th SELs 33-2 to 33-n, can distribute the same input signal to all the output lines in any given plurality of contiguous signal line pairs. Accordingly, the present embodiment can achieve the signal distribution circuit by using 2:1 selectors instead of the n:1 selectors used in the prior art signal distribution circuit. If the number n of input/output line pairs is larger than 2, the number of selectors can be reduced, which in turn serves to reduce the amount of circuitry of the signal distribution circuit.

Furthermore, according to the signal distribution circuit 30 of the present embodiment, the signal input on the i-th input line having the smallest ordinal number i in each group can at all times be made to be output on the output lines in the same group. As a result, the signal distribution circuit 30 of the present embodiment can be used to distribute a signal that need only be updated at relatively long intervals of time, such as the Cm value, as well as other signals such as the write enable signal, write address, read enable signal, read address, and data.

Figure 11:
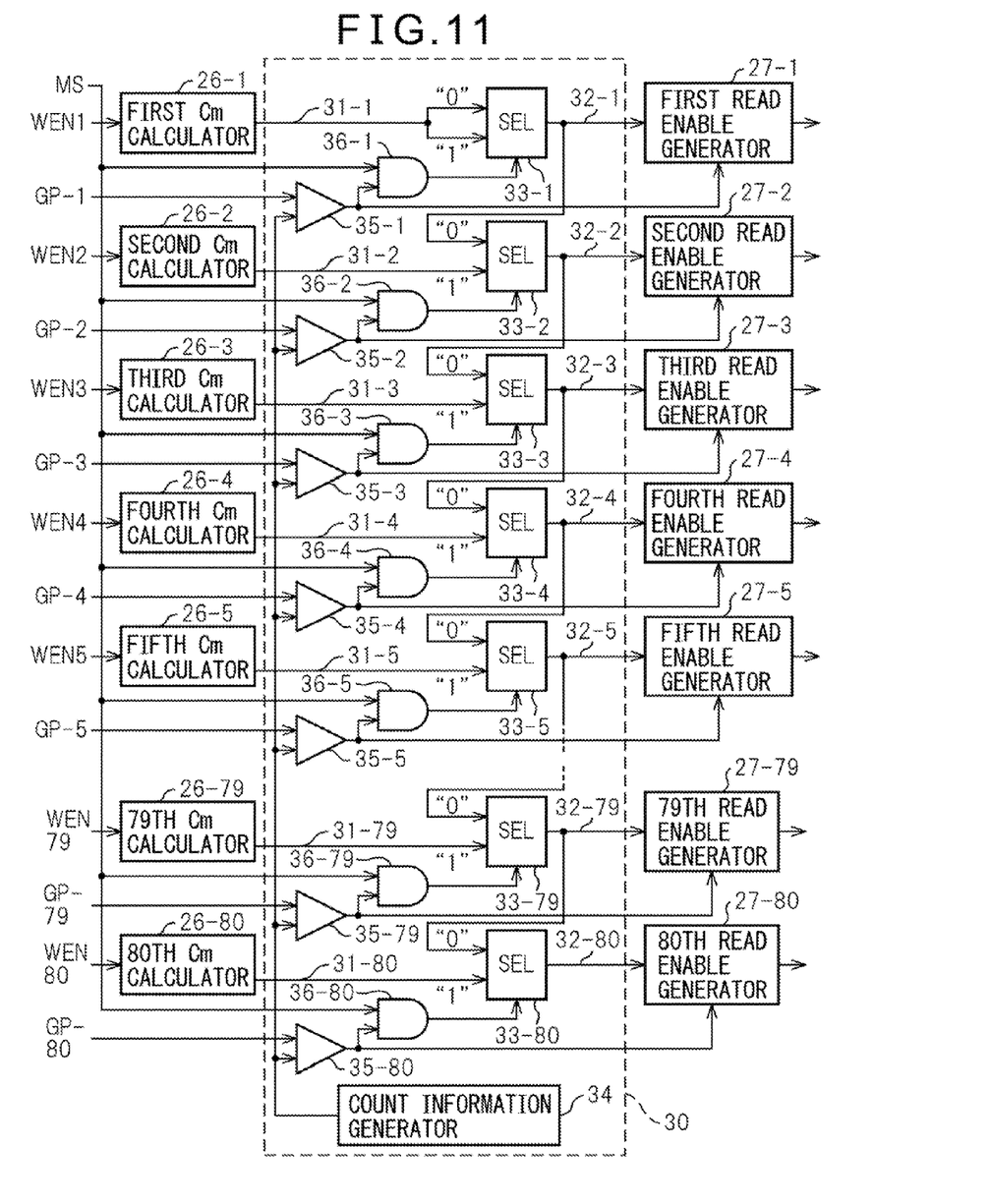
FIG. 11 is a diagram illustrating a second configuration example of the signal distribution circuit.

FIG. 11 is a diagram illustrating a second configuration example of the signal distribution circuit. The same component elements as those in FIG. 10 are designated by the same reference numerals as those used in FIG. 10. The embodiment of FIG. 11 is concerned with the case where the number n of input/output line pairs is 80.

The signal distribution circuit 30 of this embodiment takes as inputs the Cm values Cm1 to Cm80 calculated by the first to 80th Cm calculators 26-1 to 26-80 for the tributary slots TS1 to TS80. The signal distribution circuit 30 distributes the Cm value, input for the master slot in each slot group, to the i-th read enable generators 27-i that generate read enable signals for the tributary slots TSi belonging to the same slot group.

The signal distribution circuit 30 receives Cm1 to Cm80 on the first to 80th input lines 31-1 to 31-80, respectively. Signals output on the first to 80th output lines 32-1 to 32-80 are supplied as inputs to the first to 80th read enable generators 27-1 to 27-80, respectively.

The signal distribution circuit 30 includes a first SEL 33-1, a count information generator 34, comparators 35-1 to 35-80, and decision units 36-1 to 36-80. The first SEL 33-1 is a 2:1 selector that has two inputs, the first input and the second input, and that selects one of the two inputs under the control of a select signal. Cm1 is supplied to the first and second inputs of the first SEL 33-1.

The count information generator 34 generates a group selection signal that cycles through integer values from 1 to m (m is a natural number). The natural number m is the maximum value that the number of slot groups can take, and may be, for example, a value representing the largest tributary slot number. The group selection signal is used to sequentially select the slot groups.

Figure 12:
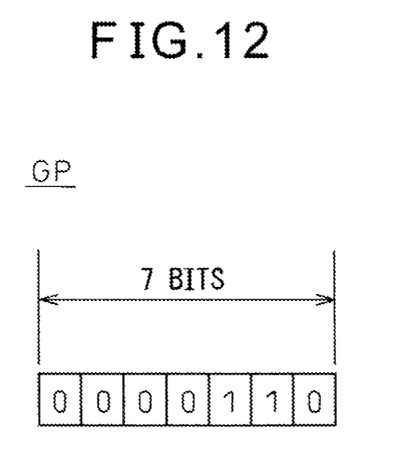
FIG. 12 is a diagram illustrating an example of the format of group information GP.

The comparator 35-i (i=1 to 80) compares group information GP-i with the current group selection signal. The group information GP-i specifies the slot group to which the i-th tributary slot TSi belongs. FIG. 12 is a diagram illustrating an example of the format of the group information GP. The group information GP-i has seven bits and specifies the slot group number to which the tributary slot TSi belongs.

Reference is made to FIG. 11. When the group information GP-i matches the current group selection signal, the comparator 35-i generates an update enable signal for updating the Cm value for the tributary slot TSi. That is, when the slot group to which the tributary slot TSi belongs is selected by the group selection signal, the comparator 35-i generates the update enable signal. The comparator 35-i supplies the update enable signal to the decision unit 36-i and the i-th read enable generator 27-i.

The decision unit 36-i takes as inputs the master specifying information MS and the update enable signal supplied from the comparator 35-i. When the update enable signal is output from the comparator 35-i, and when the tributary slot TSi is the master slot, the decision unit 36-i generates the select signal that causes the i-th SEL 33-i to select the second input. More specifically, when the slot group to which the tributary slot TSi belongs is selected by the group selection signal, and when the tributary slot TSi is the master slot, the decision unit 36-i generates the select signal that causes the i-th SEL 33-i to select the second input. The select signal is supplied to the i-th SEL 33-i.

Otherwise, the decision unit 36-i generates the select signal that causes the i-th SEL 33-i to select the first input. That is, when Cmi applied to the second input of the i-th SEL 33-i is a Cm value for a slot that does not belong to the group selected by the group selection signal, the i-th SEL 33-i selects the first input.

When the update enable signal is output from the comparator 35-i, the i-th read enable generator 27-i updates Cmi to be used for the generation of the read enable signal to the value output on the output line 32-i. When the update enable signal is not received, the i-th read enable generator 27-i does not update Cmi to be used for the generation of the read enable signal.

Figure 13:
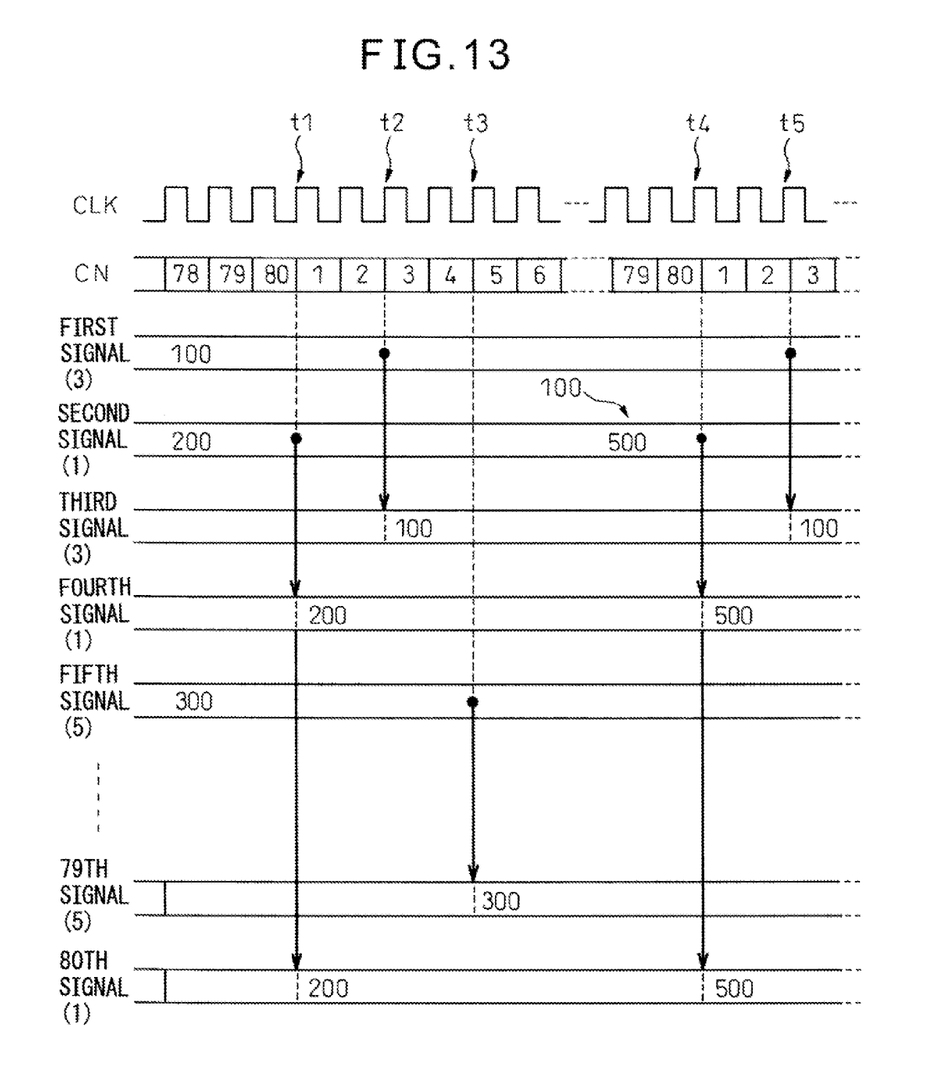
FIG. 13 is a diagram illustrating the operation of the signal distribution circuit depicted in FIG. 11.

Next, the operation of the signal distribution circuit 30 will be described. FIG. 13 is a diagram illustrating the operation of the signal distribution circuit 30 depicted in FIG. 11. In the signal timing chart of FIG. 13, signal CLK designates the clock signal for operating the signal distribution circuit 30, and signal CN designates the group selection signal. The first to 80th signals represent the Cm values calculated for the tributary slots TS1 to TS80 input on the input lines 31-1 to 31-80, respectively.

Consider the case where the tributary slots TS2, TS4, and TS80 belong to the slot group 1, the tributary slots TS1 and TS3 belong to the slot group 3, and the tributary slots TS5 and TS79 belong to the slot group 5. In FIG. 13, the slot groups to which the first to 80th signals respectively belong are indicated by numbers in parentheses.

In each slot group, the tributary slot having the smallest slot number is specified as the master slot. Accordingly, the master slots in the slot groups 1, 3, and 5 are TS2, TS1, and TS5, respectively. The Cm values currently input on the input lines 31-2, 31-1, and 31-5 for the respective master slots TS2, TS1, and TS5 are "200", "100", and "300", respectively.

At time t1 at which the group selection signal selects the slot group 1, only the second SEL 33-2 is set to select the second input, and the other selectors are each set to select the first input. As a result, "100" which is the value of Cm1 is output on the first output line 32-1, while "200" which is the value of Cm2 calculated for the master slot TS2 is output on the other output lines 32-2 to 32-80.

The update enable signal for updating the Cm value to be used for the generation of the read enable signal is supplied only to the read enable generators 27-2, 27-4, and 27-80 for TS2, TS4, and TS80 that belong to the slot group 1. Accordingly, only the read enable generators 27-2, 27-4, and 27-80 update the Cm value to be used for the generation of the read enable signal to the value "200" calculated for the master slot TS2, and the other read enable generators do not update the Cm value.

At time t2, the group selection signal selects the slot group 3. In this case, only the first SEL 33-1 is set to select the second input, and the other selectors are each set to select the first input. As a result, "100" which is the value of Cm1 is output on all the output lines 32-1 to 32-80.

The update enable signal is supplied only to the read enable generators 27-1 and 27-3 for TS1 and TS3 that belong to the slot group 3. Accordingly, only the read enable generators 27-1 and 27-3 update the Cm value to be used for the generation of the read enable signal to the value "100" calculated for the master slot TS1, and the other read enable generators do not update the Cm value.

At time t3 at which the group selection signal selects the slot group 5, only the SEL 33-5 is set to select the second input, and the other selectors are each set to select the first input. As a result, Cm1 is output on the output lines 32-1 to 32-4, while "300" which is the value of Cm5 calculated for the master slot TS5 is output on the other output lines 32-5 to 32-80.

The update enable signal is supplied only to the read enable generators 27-5 and 27-79 for TS5 and TS79 that belong to the slot group 5. Accordingly, only the read enable generators 27-5 and 27-79 update the Cm value to be used for the generation of the read enable signal to the value "300" calculated for the master slot TS5, and the other read enable generators do not update the Cm value.

When the group selection signal has cycled through all the slot groups, the group selection signal selects the group 1 at time t4. By that time, the value of Cm2 calculated for the master slot TS2 has been updated to "500" as indicated at reference numeral 100. In this case, as in the earlier described case, Cm1 is output on the first output line 32-1, while "500" which is the value of Cm2 calculated for the master slot TS2 is output on the other output lines 32-2 to 32-80. The read enable generators 27-2, 27-4, and 27-80 update the Cm value to be used for the generation of the read enable signal to the value "500" calculated for the master slot TS2, and the other read enable generators do not update the Cm value.

At time t5, the group selection signal selects the slot group 3. During the period from time t2 to time t5, the value of Cm1 has remained unchanged. In this case also, the read enable generators 27-1 and 27-3 overwrite the Cm value, held for use to generate the read enable signal, with the value "100" output on the output lines 32-1 and 32-3.

According to the present embodiment, when the same Cm value is output from a series of cascaded selectors, the read enable generator 27-i for any tributary slot not selected by the group selection signal can be prevented from updating. As a result, according to the present embodiment, even when the slot numbers of the tributary slots belonging to the same slot group are not contiguous, the signal distribution circuit 30 can be used as a signal distribution circuit for distributing the Cm value within each slot group.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A signal distribution circuit comprising:
   a plurality of input lines 1, 2, . . . n for a plurality of input signals 1, 2, . . . n (n is a natural number greater than 2);
   a plurality of selectors 2, 3, . . . i each having two input lines for accepting two input signals and one output line for outputting a selected one of the two input signals (i is a natural between 3 and n−1), wherein
   input signal 1 and input signal 2 are input to the two input lines of the selector 2, one of the input signals is selected under control of a first select signal, and the selected one of the input signals is output from the output line of the selector 2 as a signal selected by the selector 2;
   the signal selected by the selector 2 and input signal 3 are input to the two input lines of the selector 3, one of the signal selected by the selector 2 and the input signal 3 is selected under control of a second select signal, and the selected one of the signal selected by the selector 2 and the input signal 3 is output from the output line of the selector 3 as a signal selected by the selector 3; and
   signal selected by the selector i−1 and input signal n are input to the two input lines of the selector i, one of the input signals to the selector i is selected under control of a select signal of the selector i, and the selected one of the input signals to the selector i is output from the output line of the selector i.

2. The signal distribution circuit as claimed in claim 1, further comprising a signal generator which generates a group selection signal for sequentially selecting, one at a time, groups to which the plurality of signals 1, 2, . . . n respectively belong, and wherein:
   when the input signal 1 and the input signal 2 are input to the two input lines of the selector 2, and the input signal 2 does not belong to the group selected by the group selection signal, the input signal 1 is selected under control of the first a select signal, and the input signal 1 is output from the output line of the selector 2 as the signal selected by the selector 2;
   when the signal selected by the selector 2 and the input signal 3 are input to the two input lines of the selector 3, and the input signal 3 does not belong to the group selected by the group selection signal, the input signal selected by the selector 2 is selected under control of the second select signal, and the input selected signal selected by the selector 2 is output from the output line of the selector 3 as the input signal selected by the selector 3; and
   when the signal selected by the selector i−1 and the input signal n are input to the two input lines of the selector i, and the input signal n does not belong to the group selected by the group selection signal, the input selected by the selector i−1 is selected under control of the select signal of the selector i, and the selected signal is output from the output line of the selector i.

3. The signal distribution circuit as claimed in claim 1, wherein the plurality of signals 1, 2, . . . n are control signals for writing or reading data to be stored in a plurality of slots, respectively, to or from an elastic store memory.

4. The signal distribution circuit as claimed in claim 3, wherein the plurality of signals 1, 2, . . . n are signals each representing a count of a number of occurrences of a write enable signal for writing the data to be stored in the plurality of slots, respectively, to the elastic store memory.

5. The signal distribution circuit as claimed in claim 3, wherein the plurality of signals 1, 2, . . . n are write enable signals or write address signals for writing the data to be stored in the plurality of slots, respectively, to the elastic store memory.

6. The signal distribution circuit as claimed in claim 3, wherein the plurality of signals 1, 2, . . . n are read enable signals or read address signals for reading the data to be stored in the plurality of slots, respectively, from the elastic store memory.

7. The signal distribution circuit as claimed in claim 2, wherein the plurality of signals 1, 2, . . . n are signals each representing a count of a number of occurrences of a write enable signal for writing data to be stored in the plurality of slots, respectively, to the elastic store memory.

8. A stuffing control unit comprising:
   a plurality of elastic store memories that hold data to be stored in a plurality of slots; and
   a signal distribution unit which distributes a plurality of signals 1, 2, . . . n for controlling the plurality of elastic store memories (n is a natural number greater than 2), and wherein
   the signal distribution unit comprises:
   a plurality of input lines 1, 2, . . . n for the plurality of input signals 1, 2, . . . n;
   a plurality of selectors 2, 3, . . . i each having two input lines for accepting two input signals and one output line for outputting a selected one of the two input signals (i is a natural between 3 and n−1), the selected signal being a control signal for one of the plurality of elastic store memories wherein input signal 1 and signal 2 are input to the two input lines of the selector 2, one of the input signals is selected under control of a first select signal, and the selected one of the input signals is output from the output line of the selector 2 as a signal selected by the selector 2;

the signal selected by the selector 2 and input signal 3 are input to the two input lines of the selector 3, one of the signal selected by the selector 2 and the input signal 3 input signals is selected under control of a second select signal, and the selected one of the signal selected by the selector 2 and the input signal 3 is output from the output line of the selector 3 as a signal selected by the selector 3; and signal selected by the selector i-1 and input signal n are input to the two input lines of the selector i, one of the input signal selected by the selector i-1 and the input signal n is selected under control of a select signal of the selector i, and the selected one of the input signals to selector i is output from the output line of the selector i.

9. The stuffing control unit as claimed in claim 8, wherein the signal distribution unit further comprises a signal generator which generates a group selection signal for sequentially selecting, one at a time, groups to which the plurality of slots respectively belong, and wherein when the input signal 1 and the input signal 2 are input to the two input lines of the selector 2, and the input signal 2 does not belong to the group selected by the group selection signal, the input signal 1 is selected under control of select signal, and the input signal 1 is output from the output line of the selector 2 as the signal selected by the selector 2;

when the signal selected by the selector 2 and the input signal 3 are input to the two input lines of the selector 3, and the input signal 3 does not belong to the group selected by the group selection signal, the input signal selected by the selector 2 is selected under control of the second select signal, and the input selected signal selected by the selector 2 is output from the output line of the selector 3 as the input signal selected by the selector 3; and when the signal selected by the selector i-1 and the input signal n are input to the two input lines of the selector i, and the input signal n does not belong to the group selected by the group selection signal, the input selected by the selector i-1 is selected under control of the select signal of the selector i, and the selected signal is output from the output line of the selector i.

10. The stuffing control unit as claimed in claim 9, wherein the plurality of signals 1, 2, . . . n are signals each representing a count of the number of occurrences of a write enable signal for writing the data to be stored in the plurality of slots, respectively, to the plurality of elastic store memories.

11. The stuffing control unit as claimed in claim 10, further comprising a plurality of read enable signal generators which generate read enable signals for the plurality of elastic store memories, respectively, and wherein:

when the group selection signal selects one of the groups to which the plurality of slots respectively belong, one of the plurality of read enable signal generators updates the count of the number of occurrences of the write enable signal to be used to generate the read enable signal to a value output on the output line of one of the plurality of selectors.

\* \* \* \* \*